US009311142B2

(12) United States Patent
Yamashita et al.

(10) Patent No.: US 9,311,142 B2
(45) Date of Patent: Apr. 12, 2016

(54) CONTROLLING MEMORY ACCESS CONFLICT OF THREADS ON MULTI-CORE PROCESSOR WITH SET OF HIGHEST PRIORITY PROCESSOR CORES BASED ON A THRESHOLD VALUE OF ISSUED-INSTRUCTION EFFICIENCY

(75) Inventors: Koichiro Yamashita, Kawasaki (JP); Hiromasa Yamauchi, Kawasaki (JP); Kiyoshi Miyazaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 561 days.

(21) Appl. No.: 13/569,725

(22) Filed: Aug. 8, 2012

(65) Prior Publication Data
US 2012/0304183 A1 Nov. 29, 2012

Related U.S. Application Data

(63) Continuation of application No. PCT/JP2010/052792, filed on Feb. 23, 2010.

(51) Int. Cl.
G06F 9/50 (2006.01)
G06F 9/48 (2006.01)
G06F 13/18 (2006.01)
G06F 13/26 (2006.01)
G06F 13/16 (2006.01)
G06F 9/52 (2006.01)
G06F 9/445 (2006.01)

(52) U.S. Cl.
CPC ............... *G06F 9/4881* (2013.01); *G06F 9/52* (2013.01); *G06F 9/44552* (2013.01); *G06F 13/1652* (2013.01); *G06F 13/18* (2013.01); *G06F 13/26* (2013.01)

(58) Field of Classification Search
None
See application file for complete search history.

(56) References Cited

U.S. PATENT DOCUMENTS

| 5,202,991 | A  | * | 4/1993  | Gamache et al. ............. 718/103 |
|-----------|----|---|---------|--------------------------------------|
| 5,893,157 | A  |   | 4/1999  | Greenspan et al.                     |
| 5,968,168 | A  |   | 10/1999 | Kato                                 |
| 2005/0240933 | A1 | * | 10/2005 | Barsness et al. ............. 718/105 |
| 2006/0036810 | A1 | * | 2/2006  | Accapadi .............. G06F 9/5027 711/132 |
| 2006/0112208 | A1 | * | 5/2006  | Accapadi et al. ............. 710/265 |
| 2007/0214302 | A1 | * | 9/2007  | Kubo et al. .................. 710/305 |
| 2008/0074433 | A1 | * | 3/2008  | Jiao et al. ..................... 345/522 |

(Continued)

FOREIGN PATENT DOCUMENTS

JP 5-225149 9/1993
JP 9-330237 12/1997

(Continued)

OTHER PUBLICATIONS

International Preliminary Report on Patentability mailed Sep. 7, 2012 (English Translation mailed Sep. 27, 2012) in corresponding International Patent Application No. PCT/JP2010/052792.

(Continued)

*Primary Examiner* — Abdullah Al Kawsar
(74) *Attorney, Agent, or Firm* — Staas & Halsey LLP

(57) ABSTRACT

A multi-core processor system includes multiple cores and memory accessible from the cores, where a given core is configured to detect among the cores, first cores having a highest execution priority level; identify among the detected first cores, a second core that caused access conflict of the memory; and control a third core that is among the cores, excluding the first cores and the identified second core, the third core being controlled to execute for a given interval during an interval when the access conflict occurs, a thread that does not access the memory.

6 Claims, 9 Drawing Sheets

(56) References Cited

U.S. PATENT DOCUMENTS

| | | |
|---|---|---|
| 2008/0244583 A1 | 10/2008 | Horikawa |
| 2009/0138682 A1* | 5/2009 | Capps, Jr. .......... G06F 9/30101 712/220 |
| 2010/0250998 A1* | 9/2010 | Herdrich .............. G06F 1/3203 713/501 |
| 2011/0055479 A1* | 3/2011 | West et al. .................... 711/118 |

FOREIGN PATENT DOCUMENTS

| | | |
|---|---|---|
| JP | 11-15793 | 1/1999 |
| JP | 2001-84235 | 3/2001 |
| JP | 2003-30042 | 1/2003 |
| JP | 2008-269578 | 11/2008 |

OTHER PUBLICATIONS

Sasaki et al, *Dynamic Optimization for CMP by Efficient Regression Modeling*, Aug. 5-7, 2008, IPSJ SIG Technical Reports, pp. 31-36.

International Search Report of Corresponding PCT Application PCT/JP2010/052792 mailed Mar. 23, 2010.

\* cited by examiner

FIG.7

| PROCESS NAME | EXECUTION PRIORITY LEVEL |
|---|---|
| COMMUNICATION PACKET RECEPTION | REAL-TIME |
| IMAGE RENDERING | NORMAL |
| UI INPUT | REAL-TIME |
| DICTIONARY LOOKAHEAD SEARCH | NORMAL |

303-1

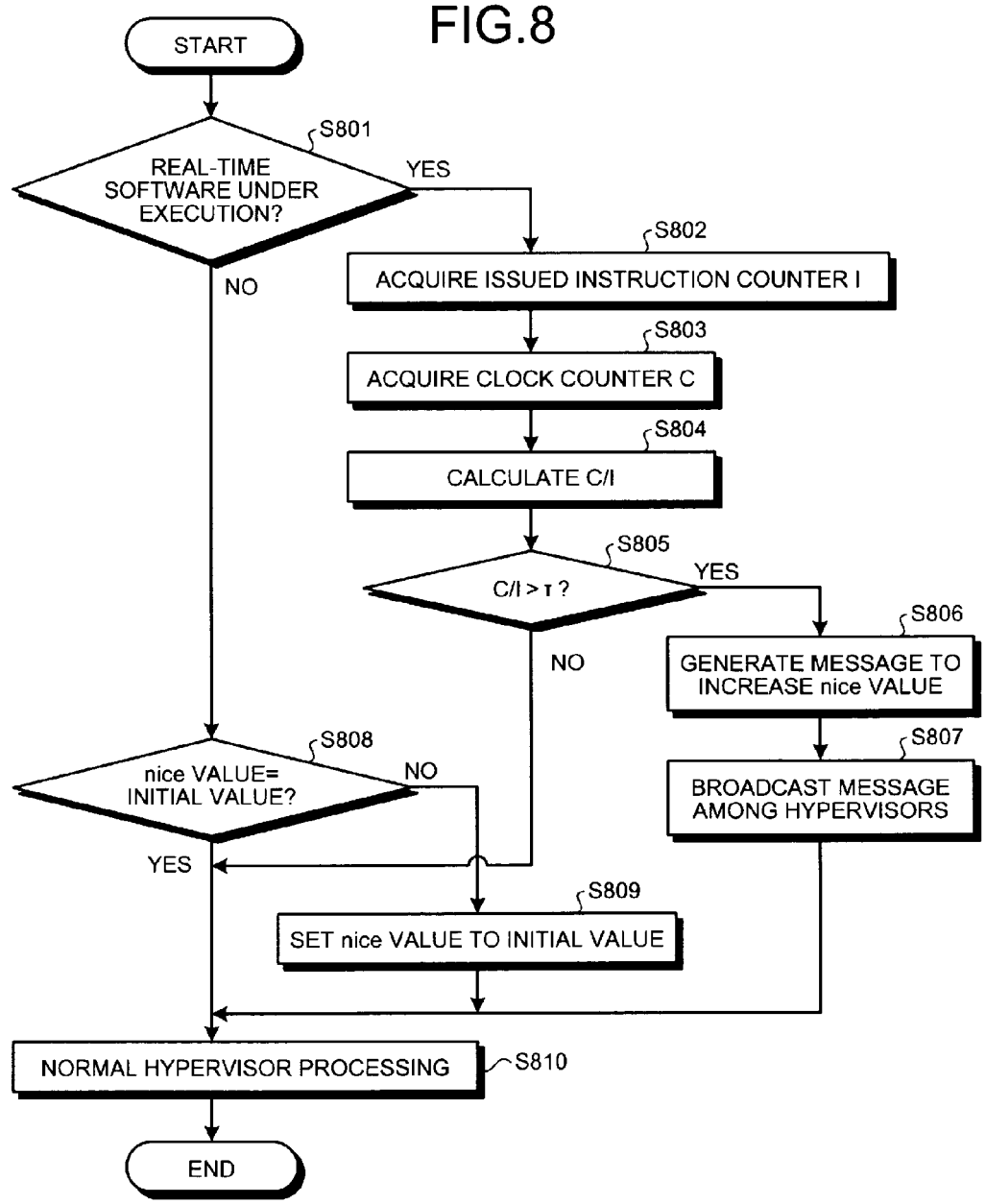

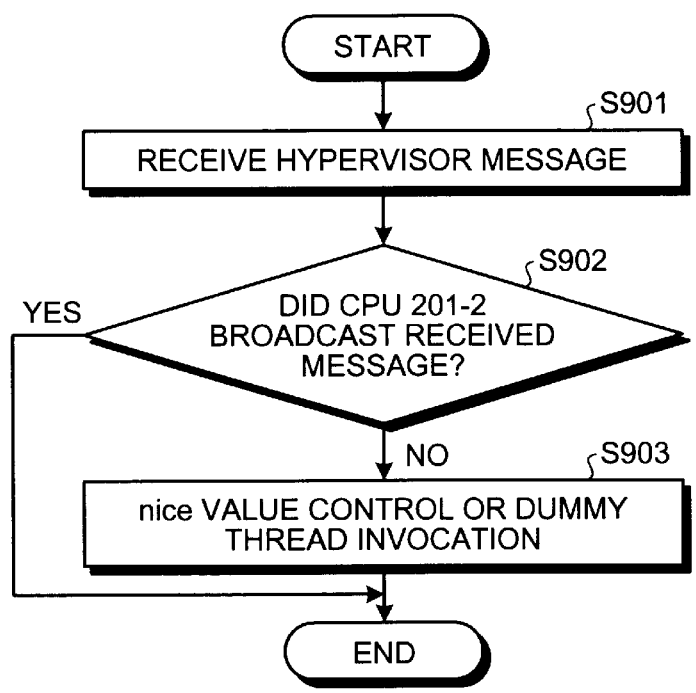

US 9,311,142 B2

CONTROLLING MEMORY ACCESS CONFLICT OF THREADS ON MULTI-CORE PROCESSOR WITH SET OF HIGHEST PRIORITY PROCESSOR CORES BASED ON A THRESHOLD VALUE OF ISSUED-INSTRUCTION EFFICIENCY

CROSS REFERENCE TO RELATED APPLICATIONS

This application is a continuation application of International Application PCT/JP2010/052792, filed on Feb. 23, 2010, and designating the U.S., the entire contents of which are incorporated herein by reference.

FIELD

The embodiments discussed herein are related a multi-core processor system, a thread control method, and a thread control program that control a thread.

BACKGROUND

Conventionally, multi-programming technology has existed where multiple programs are run on a single central processing unit (CPU). An operating system (OS) has a function of dividing the processing time of the CPU and by allocating processes and/or threads to the resulting time periods, the CPU simultaneously runs multiple processes and/or threads. Herein, a process is an execution unit of a program.

Technology has been disclosed for processes that have to finish within a given time period, where the OS allocates the CPU more time for such a thread than other processes, whereby processing is performed preferentially and the processing is performed within the given time period. Further, as technology that effectively switches processes, technology has been disclosed where the OS acquires for each process, the number of execution instructions and first executes the process having the most execution instructions (see, for example, Japanese Laid-Open Patent Publication No. H9-330237). In the technology, the process occupying the cache memory most is executed, whereby overall throughput can be improved.

Technology for a multi-core processor system, where multiple CPUs are provided in a computer system, has also been disclosed. Consequently, in the multi-programming technology, the OS can allocate multiple programs to multiple processes. Further, a multi-core processor system having a distributed system structure has been disclosed, where each CPU has dedicated memory, and when other data is necessary, shared memory is accessed. A multi-core processor system having a centralized system structure has also been disclosed, where each CPU has only cache memory and necessary data is stored in shared memory.

Nonetheless, in the multi-core processor system, when multiple CPUs simultaneously access the shared memory, contention occurs. When contention occurs, the CPUs cannot complete processing within the normal processing period, arising in a problem that real-time processing, which requires completing processing within a given time period, cannot be performed. Real-time processing is processing that has to be completed by a time preliminarily determined at the design stage, and is processing that has an interval period allowing some time between the occurrence of an interrupt event and the start of interrupt processing.

Contention is caused by hardware. Therefore, in the conventional technologies above, even if the technology disclosed in Japanese Laid-Open Patent Publication No. H9-330237, is applied, a problem arises in that the CPU has the potential of causing contention consequent to the process that occupies the cache memory most and resolution of the contention falls short.

When the distributed system is applied, although the frequency of contention is low, since memory has to be provided for each CPU, cost and power consumption is high. Therefore, in integrated environments having cost and power consumption limitations, a multi-core processor system employing a centralized system is often adopted. However, a multi-core processor system employing a centralized system has a problem in that there are many occasions where multiple CPUs simultaneously access the shared memory and thus, contention occurs frequently.

SUMMARY

According to an aspect of an embodiment, a multi-core processor system includes multiple cores and memory accessible from the cores, where a given core is configured to detect among the cores, first cores having a highest execution priority level; identify among the detected first cores, a second core that caused access conflict of the memory; and control a third core that is among the cores, excluding the first cores and the identified second core, the third core being controlled to execute for a given interval during an interval when the access conflict occurs, a thread that does not access the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram depicting an example of the contents of the priority level table 303-1;

FIG. 8 is a flowchart depicting message transmission processing by a hypervisor; and FIG. 9 is a flowchart depicting message reception processing by a hypervisor.

DESCRIPTION OF EMBODIMENTS

Preferred embodiments of a multi-core processor system, a thread control method, and a thread control program will be explained with reference to the accompanying drawings.

Figure 1:
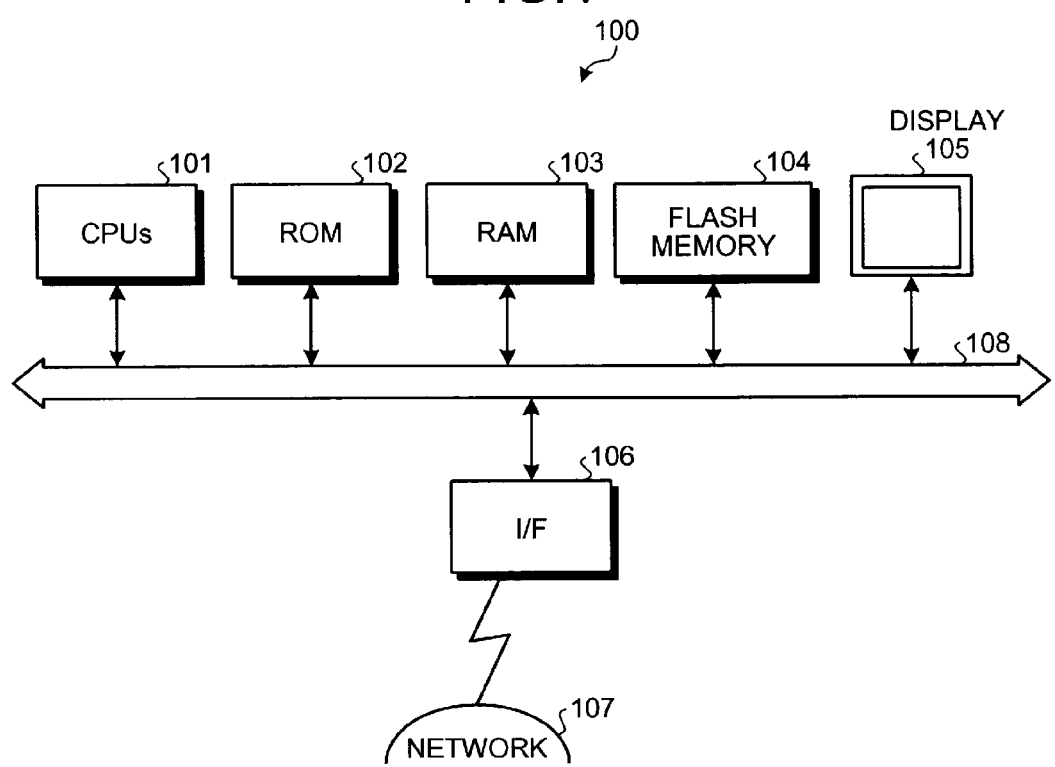
FIG. 1 is a block diagram depicting a hardware configuration of a multi-core processor system according to an embodiment.

FIG. 1 is a block diagram depicting a hardware configuration of a multi-core processor system according to an embodiment. A multi-core processor system is a computer system that includes a processor equipped with multiple cores. Provided multiple cores are equipped, the processor may be a single processor equipped with multiple cores or a group of single-core processors in parallel. In the present embodiment, for the sake of simplicity, description will be given taking a processor group of parallel CPUs that are single-core processors as an example.

A multi-core processor system 100 includes multiple CPUs 101, read-only memory (ROM) 102, random access memory (RAM) 103, and flash memory 104. The multi-core processor system 100 includes a display 105 and an interface (I/F) 106 as input/output apparatuses for a user or a device. The components are respectively connected by a bus 108. A centralized system structure is employed for the hardware configuration according to the present embodiment.

The CPUs 101 govern overall control of the multi-core processor system. The CPUs 101 correspond to all of the CPUs that are single-core processors connected in parallel. Details will be described with reference to FIG. 2. The ROM 102 stores programs, such as a boot program. The RAM 103 is used as a work area of the CPUs 101.

The flash memory 104 is re-writable and is non-volatile semiconductor memory having the characteristic of retaining data even when the power supply is cut. The flash memory 104 stores software programs, data, etc. Although a hard disk drive (HDD), which is a magnetic disk, may be used in place of the flash memory 104, use of the flash memory 104 affords greater tolerance of vibration compared to the HDD which operates mechanically. For example, even when an apparatus configured by the multi-core processor system 100 is subject to strong vibrations, the potential of data being lost can be reduced in the case of the flash memory 104.

The display 105 displays, for example, data such as text, images, functional information, etc., in addition to a cursor, icons, and/or tool boxes. A thin-film-transistor (TFT) liquid crystal display, etc., may be employed as the display 105. Further, the display 105 may enable input by a touch panel.

The I/F 106 is connected to a network 107 such as a local area network (LAN), a wide area network (WAN), and the internet, by a communication line and is connected to other apparatuses through the network 107. The I/F 106 administers an internal interface with the network 107 and controls the input and output of data with respect to external apparatuses. For example, a modem or a LAN adaptor may be employed as the I/F 106.

Figure 2:
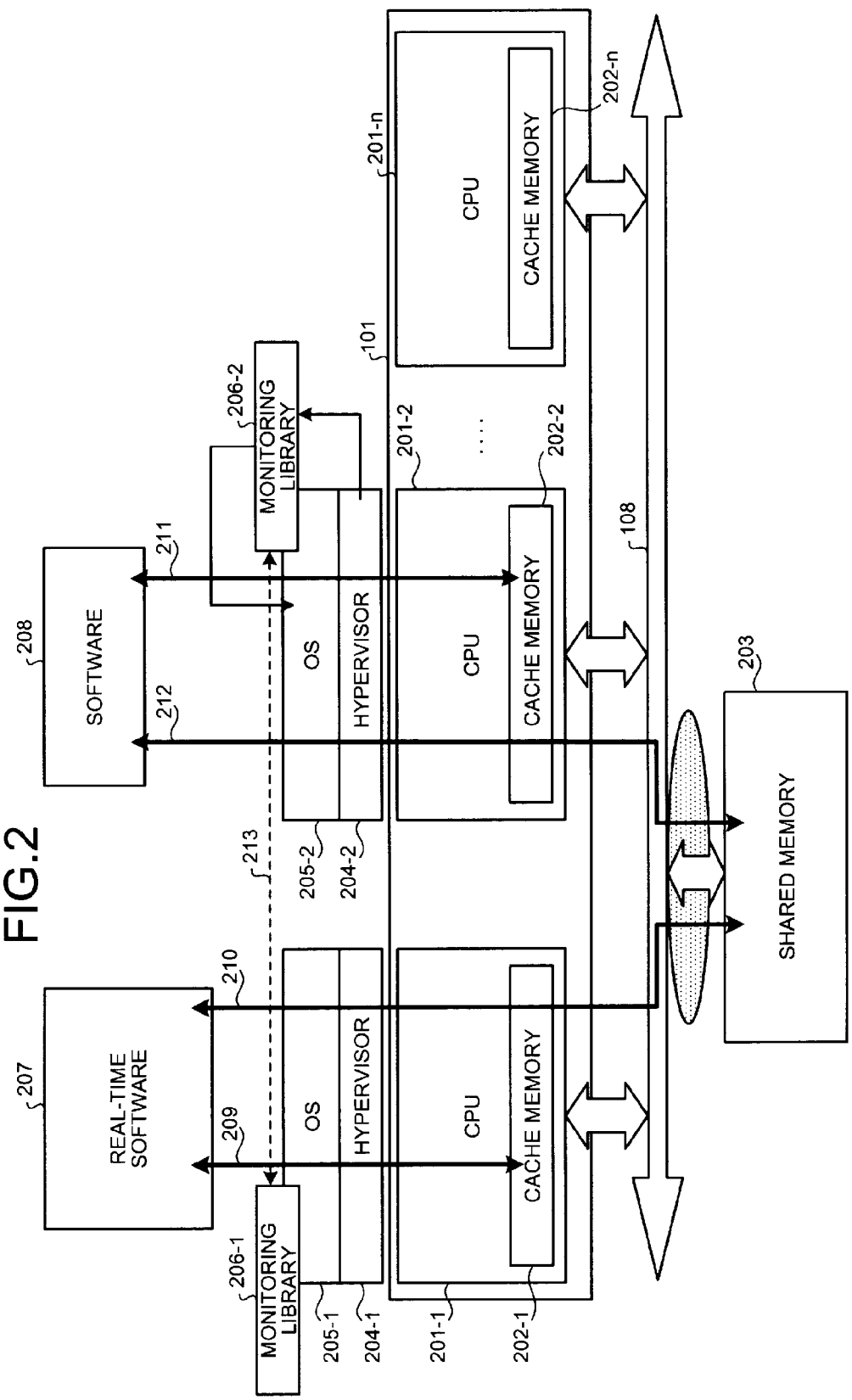
FIG. 2 is a block diagram depicting a portion of the hardware configuration of each CPU and a software configuration of a multi-core processor system 100.

FIG. 2 is a block diagram depicting a portion of the hardware configuration of each CPU and a software configuration of the multi-core processor system 100. The hardware configuration of the multi-core processor system 100 includes the CPUs 101 and shared memory 203. The CPUs 101 include, for example, a CPU 201-1, a CPU 201-2, . . . , and a CPU 201-n.

The CPU 201-1, the CPU 201-2, . . . , and the CPU 201-n, have cache memory 202-1, cache memory 202-2, . . . , and cache memory 202-n, respectively. Each CPU and the shared memory 203 are respectively connected by the bus 108. Hereinafter, description will be given with respect to the CPU 201-1 and the CPU 201-2.

As a software configuration of the multi-core processor system 100, the CPU 201-1 executes a hypervisor 204-1 and an OS 205-1. By the control of the hypervisor 204-1, the CPU 201-1 executes a monitoring library 206-1. Similarly, by the control of the OS 205-1, the CPU 201-1 executes real-time software 207. Similarly, the CPU 201-2 executes a hypervisor 204-2 and an OS 205-2. By the control of the hypervisor 204-2, the CPU 201-2 executes a monitoring library 206-2 and by control of the OS 205-2, the CPU 201-2 executes software 208.

When the CPU 201-1 executes the real-time software 207, data access includes 2, paths, access path 209 and access path 210. Similarly, when the CPU 201-2 executes the software 208, data access includes 2, paths, access path 211 and access path 212. Further, the hypervisor 204-1, the hypervisor 204-2, a hypervisor running on another CPU performs hypervisor intercommunication 213.

The CPU 201-1, the CPU 201-2, . . . , and the CPU 201-n, govern control of the multi-core processor system 100. The CPU 201-1, the CPU 201-2, . . . , and the CPU 201-n, may perform symmetric multi-processing (SMP) where processing is symmetrically and uniformly allocated. Further, the CPU 201-1, the CPU 201-2, . . . , and the CPU 201-n, may perform asymmetric multi-processing (ASMP) where a CPU is designated to take on processing according to the contents of the processing. For example, in the case of ASMP, the multi-core processor system 100 may allocate to the CPU 201-1, real-time processing that has to be preferentially performed.

The shared memory 203 is a storage area accessible from the CPU 201-1, the CPU 201-2, . . . , and the CPU 201-n, (e.g., the ROM 102, the RAM 103, and the flash memory 104). Further, for example, when the CPU 201-1 is requested to display image data on the display 105, video RAM (VRAM) included in the RAM 103 is accessed and image data is written into the VRAM. Therefore, even when the CPU 201-1 accesses the display 105, the access is regarded as an accessing of the shared memory 203.

The same is similarly true, for example, when the CPU 201-1 accesses the I/F 106. For example, if the I/F 106 is a LAN adapter, a buffer in the LAN adapter is accessed or the RAM 103 is accessed, followed by transfer to the LAN adapter. In either case, since the shared memory is regarded as being accessed from the perspective of the CPU 201-1 and the CPU 201-2, in a case where the CPU 201-1 and the CPU 201-2 access the I/F 106, the access is included in an accessing of the shared memory 203. Similarly, when the CPU 201-1 accesses the I/F 106, the access is regarded as an accessing of a shared storage area prepared by a device driver that controls the I/F 106 and as a result, the access is regarded as an accessing of the shared memory 203.

Hypervisor 204-1 and the hypervisor 204-2 are programs that run on the CPU 201-1 and the CPU 201-2, respectively. A function of the hypervisors in addition to being positioned between the OS and the CPU, performing OS monitoring, and performing resetting when the OS becomes hung up, is to perform transition to a power saving mode when the OS is not executing any threads. Further, the CPU 201-1 and the CPU 201-2, via the respective hypervisors, execute the monitoring library 206-1 and the monitoring library 206-2 that monitor contention.

the OS 205-1 and the OS 205-2 are programs of the CPU 201-1 and the CPU 201-2, respectively, and operating on the hypervisor 204-1 and the hypervisor 204-2. For example, the OS 205-1 has a thread scheduler that allocates to and causes the CPU 201-1 to execute the real-time software 207.

The monitoring library 206-1 and the monitoring library 206-2 are programs that operate on the hypervisor 204-1 and the hypervisor 204-2, and that perform monitoring to confirm that contention consequent to access conflict of the shared memory 203 is not occurring. When monitoring results indicate that contention is occurring, the monitoring library transmits information between the hypervisors and transmits to another hypervisor, indication that contention has occurred.

The real-time software 207 is a program allocated by the OS 205-1 to the CPU 201-1. Communication packet processing is an example of real-time software. Communication packet processing requires that processing being performed within a protocol-determined period, i.e., requires real-time processing. The software 208 is a program allocated by the OS 205-2 to the CPU 201-2. The software 208 does not require real-time processing. As described, in the present embodiment, software that requires guaranteed real-time processing is assumed to be executed at the CPU 201-1.

The access path 209 is a path by which the CPU 201-1 accesses the cache memory 202-1. The access path 210 is a path by which the CPU 201-1 accesses the shared memory 203. A difference between the access path 209 and the access path 210 is that if data accessed by the real-time software 207 is in the cache memory 202-1, the access path 209 is used and if the data is not in the cache memory 202-1, the access path 210 is used. Similarly, for the access path 211 and the access path 212, the access path 211 is a path by which the CPU 201-2 accesses the cache memory 202-2 and access path 212 is a path by which the CPU 201-2 accesses the shared memory 203.

The hypervisor intercommunication 213 is the exchange of messages between hypervisors. For example, at the CPU 201-1, if contention arises during execution of the real-time software 207, a message is broadcast from the hypervisor 204-1 to all hypervisors, including the hypervisor 204-2.

Figure 3:
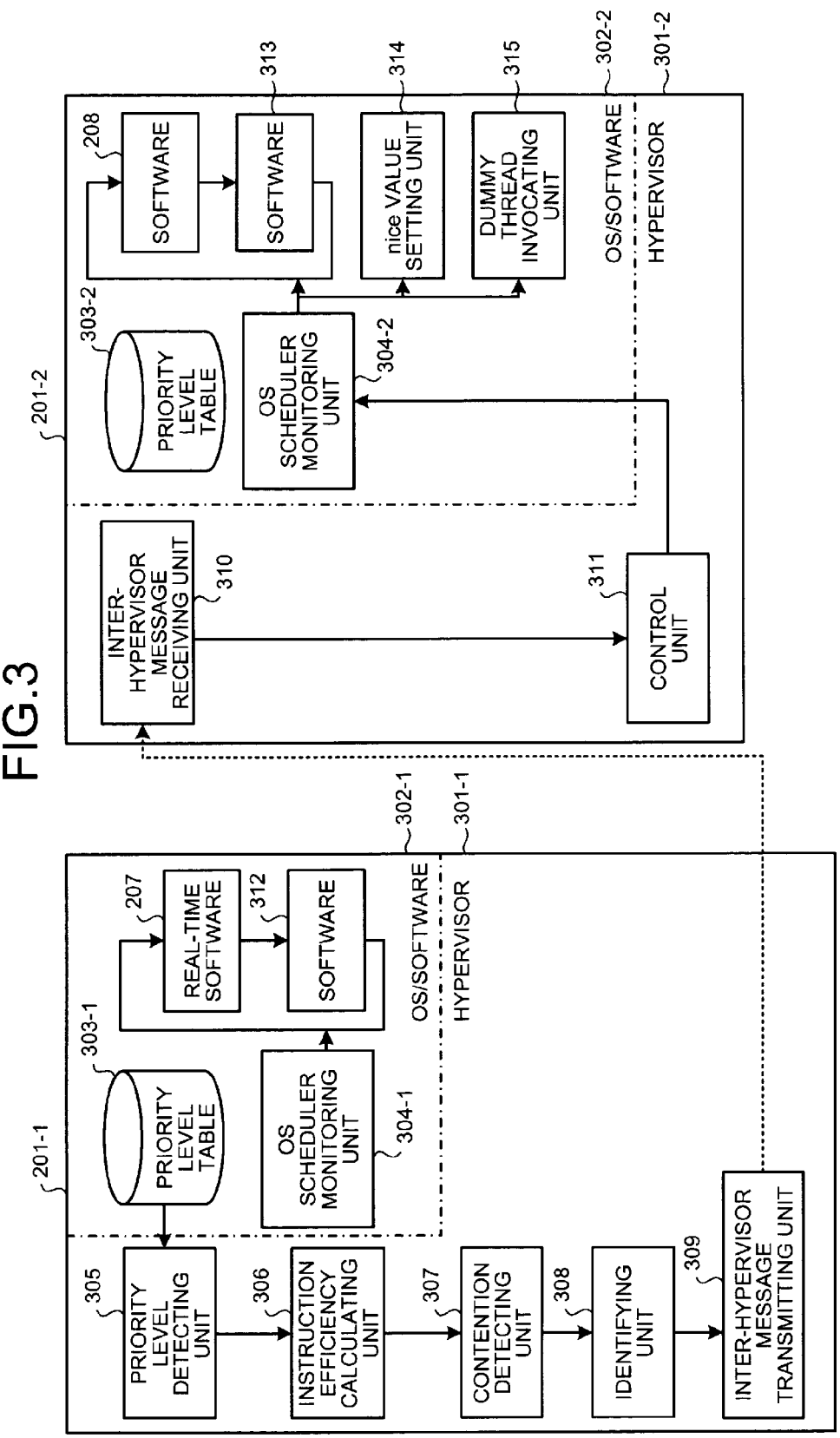
FIG. 3 is a block diagram of a functional configuration of the multi-core processor system 100.

FIG. 3 is a block diagram of a functional configuration of the multi-core processor system 100. The multi-core processor system 100 includes a priority level detecting unit 305, an instruction efficiency calculating unit 306, a contention detecting unit 307, an identifying unit 308, and a control unit 311. These functions (the priority level detecting unit 305 to the control unit 311) forming a controller, for example, are implemented by executing on the CPUs 101, a program stored in a storage device such as the ROM 102, the RAM 103, and the flash memory 104 depicted in FIG. 1.

the CPU 201-1, the CPU 201-2, . . . , and the CPU 201-n, execute hypervisors and OS/software. In FIG. 3, the priority level detecting unit 305 to an inter-hypervisor message transmitting unit 309 depicted in an area 301-1 demarcated by a dashed line are implemented by an execution of a portion of the functions of the hypervisor 204-1 by the CPU 201-1. Similarly, an inter-hypervisor message receiving unit 310 and the control unit 311 depicted in an area 301-2 are implemented by an execution of a portion of the functions of the hypervisor 204-2 by the CPU 201-2.

Although not depicted, hypervisors executed by cores other than the CPU 201-1 also have the functions of the priority level detecting unit 305 to the inter-hypervisor message transmitting unit 309. Similarly, hypervisors executed by cores other than the CPU 201-2 also have the functions of the inter-hypervisor message receiving unit 310 and the control unit 311. Further, the priority level detecting unit 305 to the inter-hypervisor message transmitting unit 309 correspond to the monitoring library 206-1. Similarly, the inter-hypervisor message receiving unit 310 and the control unit 311 correspond to the monitoring library 206-2.

An OS scheduler monitoring unit 304-1, the real-time software 207, and software 312 depicted in an area 302-1 are implemented by an execution of a portion of the functions of the OS 205-1 by the CPU 201-1. A priority level table 303-1 is a table accessible from the hypervisor 204-1 or the OS 205-1.

An OS scheduler monitoring unit 304-2, the software 208, software 313, a nice value setting unit 314, and dummy thread invocating unit 315 depicted in an area 302-2 are implemented by an execution of a portion of the functions of the OS 205-2 by the CPU 201-2. A priority level table 303-2 is a table accessible from the hypervisor 204-2 or the OS 205-2.

The priority level table 303-1 and the priority level table 303-2 are tables that associate and manage the processes executed by the multi-core processor system 100 and the priority levels of the processes. An example of the contents of the priority level table 303-1 will be described with reference to FIG. 7.

The OS scheduler monitoring unit 304-1 and the OS scheduler monitoring unit 304-2 have a function of monitoring software allocated to the CPU 201-1 and the CPU 201-2. For example, the real-time software 207 is assumed to be allocated to the CPU 201-1 and the real-time software 207 is assumed to request access to shared resources on the RAM 103 and/or the flash memory 104.

In this case, if another software has already declared use of the shared resources, the OS scheduler monitoring unit 304-1 sets the execution state of the real-time software 207 to a standby state. Subsequently, the OS scheduler monitoring unit 304-1 sets software that has entered an executable state, e.g., the software 312, to an execution state and allocates the software to the CPU 201-1.

As another example, when the real-time software 207 has been allocated to the CPU 201-1 for a given interval or longer, the OS scheduler monitoring unit 304-1 allocates other software to the CPU 201-1. Further, the switching of software allocated to the CPU as described is called dispatching.

When newly invoking software, the OS scheduler monitoring unit 304-1 invokes the software as threads at the execution positions of the software. Each thread has register information that includes the stack area and a program counter. Each time the OS scheduler monitoring unit 304-1 performs dispatch, the register information for the software currently under execution is saved to the shared memory 203 and the register information for the next software is acquired from the shared memory 203 and set as the register information for the CPU.

The multi-core processor system 100 may form 1 process from a set of threads. Although memory space is shared between threads, memory space between processes is dedicated and not directly accessible by other processes. In the present embodiment, although a thread will be used in the description, a process may be interchanged with the thread.

When allocating other software to the CPU 201-1 and multiple allocation candidates are present, the OS scheduler monitoring unit 304-1 may perform allocation based on the priority level table 303-1. Further, the OS scheduler monitoring unit 304-1 may perform allocation based on the allocation time of each software, where the software having the oldest allocation time is allocated.

The priority level detecting unit 305 has a function of detecting from among the cores, first cores having the highest execution priority level. The cores in this case correspond to the CPU 201-1, the CPU 201-2, . . . , and the CPU 201-n, configuring the CPUs 101. If the multi-core processor system 100 performs ASMP and a CPU that has been allocated real-time processing is present, the first cores may be detected by a CPU.

For example, the CPU 201-1 acquires from the priority level table 303-1, the priority level of software currently allocated and if the priority level is "real-time", the CPU is regarded as a first core having the highest execution priority level. Information of the first core is stored to the cache memory 202-1, a general register of the CPU 201-1, etc.

The instruction efficiency calculating unit 306 has a function of calculating an issued-instruction efficiency for each core and based on an issued instruction count of the instructions issued by the core and a cycle count of the core. The issued instruction count is the number of times that a CPU performs an instruction within a given period. The issued instruction count is stored by an issued instruction counter I that is a special register of the CPU and the value of the issued instruction counter I is acquired consequent to the hypervisor transitioning to a supervisor mode. The cycle count is the number of clocks input to the CPU during the given period. The cycle count is stored by a clock counter C, which is a register of the CPU. The issued-instruction efficiency is the clock count for 1, instruction and is calculated by C/I. The instruction efficiency calculating unit 306 may calculate the issued-instruction efficiency as I/C and take the reciprocal of a threshold τ (described hereinafter) for comparison.

For example, each time the hypervisor 204-1 is invoked, the CPU 201-1 calculates C/I. Since the hypervisor is executed at intervals of 1, time every several tens of microseconds to several milliseconds, the values of the issued instruction counter I and the clock counter C are acquired for that time and C/I is calculated. The calculated issued-instruction efficiency is stored to a storage area such as the cache memory 202-1, a general register of the CPU 201-1, etc.

The contention detecting unit 307 has a function of detecting access conflict, based on the issued-instruction efficiency calculated by the instruction efficiency calculating unit 306 and a given threshold. The given threshold is a value that can be set from specifications and is represented by τ. A method of setting the threshold τ will be described with reference to FIG. 4. For example, if the issued instruction count is greater than the threshold τ, the CPU 201-1 detects that contention consequent to access conflict of the shared memory 203 has occurred. Detection results are stored to a storage area such as the cache memory 202-1, a general register of the CPU 201-1, etc.

The identifying unit 308 has a function of identifying among the first cores detected from among the cores by the priority level detecting unit 305, a second core that has caused access conflict of the shared memory 203. The identifying unit 308 may further identify a third core that causes access conflict of the shared memory 203 and competes with the second core. When an occurrence of contention consequent to access conflict is detected, the CPU 201-1 may detect the contention by the contention detecting unit 307.

For example, the CPU 201-1 identifies as a second core and from among the CPUs detected by the priority level detecting unit 305 to have the priority level "real-time", a CPU causing contention. Further, the CPU 201-1 may identify as a third core and from among the cores, a CPU causing contention. Information of the identified second core or third core is stored to a storage area such as the cache memory 202-1, a general register of the CPU 201-1, etc.

The inter-hypervisor message transmitting unit 309 has a function of broadcasting messages to other hypervisors. For example, the hypervisor 204-1, which is performing real-time processing and has detected the occurrence of contention, broadcasts a message through the bus 108, to the hypervisor 204-2 and other hypervisors. Contents of the message may be stored to a storage area such as the cache memory 202-1, a general register of the CPU 201-1, etc.

The inter-hypervisor message receiving unit 310 has a function of receiving messages from other hypervisors. For example, the hypervisor 204-2 receives a message from the hypervisor 204-1 that is performing real-time processing and has detected the occurrence of contention. Contents of the received message are stored to a storage area such as the cache memory 202-2, a general register of the CPU 201-2, etc.

The control unit 311 has a function of controlling a third core that is among the cores and exclusive of the first cores and the second core identified by the identifying unit 308, to execute a thread that does not access the shared memory 203. Further, the control unit 311 may control a third core that is exclusive of the second core, to execute a thread that does not access the shared memory 203. Further, when a third core has been identified by the identifying unit 308, the control unit 311 may control the identified third core to execute a thread that does not access the shared memory 203.

The interval during which the thread that does not access the shared memory 203 is executed is a given interval during the interval during which access conflict occurred. The given interval is the value of a time slice maintained by the OS 205-2. Further, the given interval may be intervals respectively split from the interval during which access conflict occurred and for the thread allocated to the third core and the thread that does not access the shared memory 203.

For example, since the identified second core performs hypervisor intercommunication, the CPU that has received the message is the third core and the second core controls the OS scheduler monitoring unit 304-2 to execute a thread that does not access the shared memory 203. For example, the control unit 311 controls the OS scheduler monitoring unit 304-2 to execute the nice value setting unit 314 or the dummy thread invocating unit 315.

The nice value setting unit 314 has a function of setting a nice value of software currently under execution. The nice value is a value set by a nice command defined by Portable Operating System Interface for UNIX (registered trademark) (POSIX). Consequent to a changing of the set value by a nice command, the OS 205-2 controls the execution priority level of software.

For example, for software that does not require real-time processing, if the nice value is increased, the priority level decreases. As one example of nice command implementation, a method may be adopted where the OS 205-2 calculates the value added to the nice value, at the time of completion of allocation of software; and based on the added value, the OS scheduler monitoring unit 304-2 determines the software having the smallest value to be subject to dispatching.

Thus, concerning the software subject to dispatching, the greater the nice value is, the lower the priority level is. Therefore, if the OS 205-2 does not comply with POSIX specifications and even when no nice command is present, the nice value setting unit 314 may be realized by an addition of the processing above. The value set is stored to a storage area such as the RAM 103, the flash memory 104, etc.

The dummy thread invocating unit 315 has a function of generating a thread that does not access the shared memory 203. For example, the CPU 201-2 invokes a thread that, at given periods, executes nop, which is code that does not run with respect to the CPU. Further, the nice value setting unit 314 and the dummy thread invocating unit 315 are executed by the OS scheduler monitoring unit 304-2 for at least a portion of an interval when contention consequent to access conflict occurs.

Figure 4:
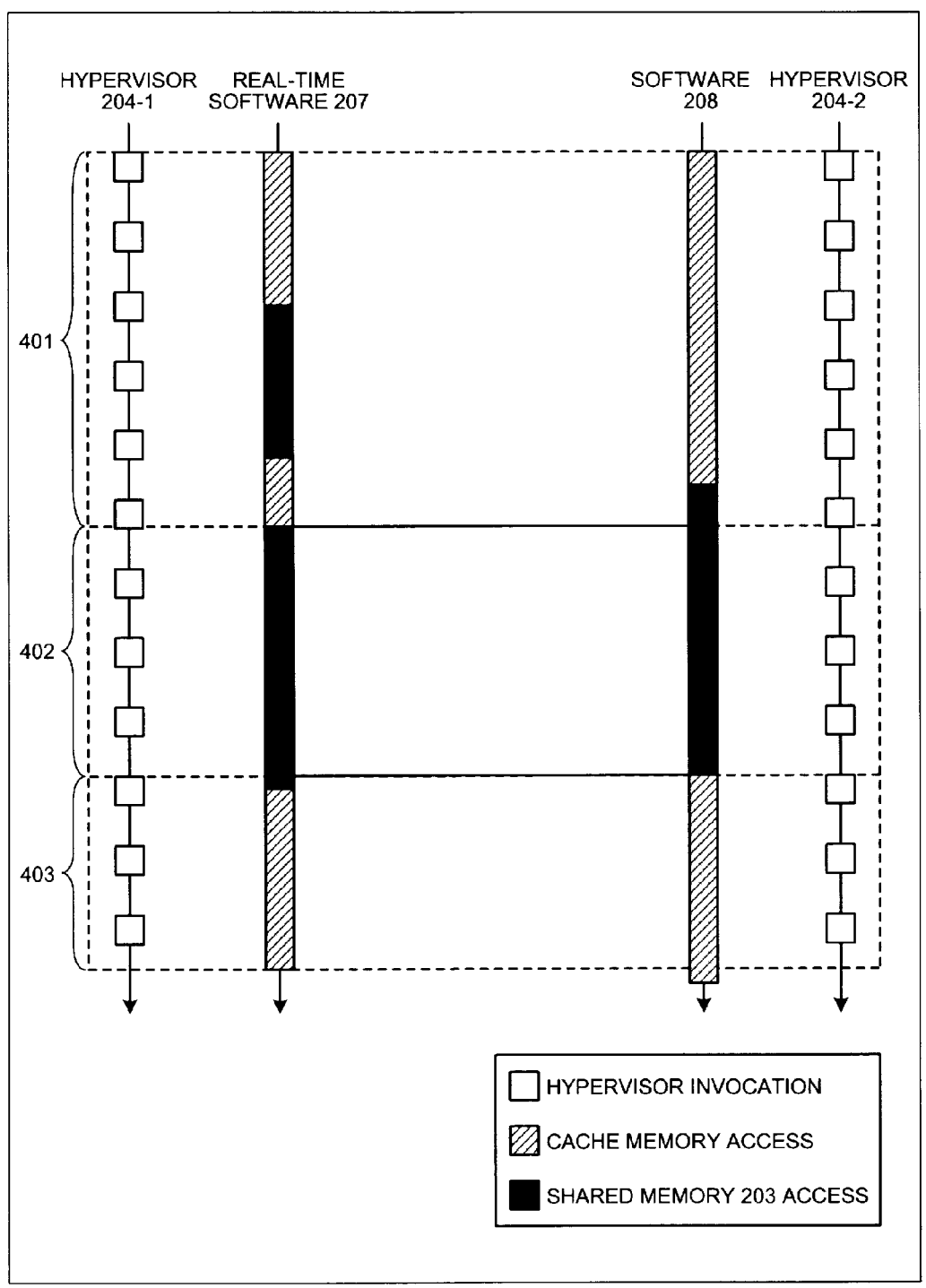
FIG. 4 is a diagram depicting a contention state.

FIG. 4 is a diagram depicting a contention state. The CPU 201-1 is executing the hypervisor 204-1 and the real-time software 207; the CPU 201-2 is executing the hypervisor 204-2 and the software 208. The respective CPUs, via the software under execution, access the cache memory or the shared memory 203.

The hypervisor is periodically invoked. The invocation interval is from several tens of microseconds to several milliseconds. In FIG. 4, the depicted period is divided according to the memory accessed and depicted as period 401, period 402, and period 403. During the period 401 and the period 403, the CPU 201-1 and the CPU 201-2 are not simultaneously accessing the shared memory 203 via the real-time software 207 and the software 208 and therefore, contention does not arise.

However, during the period 402, the CPU 201-1 and the CPU 201-2 simultaneously access the shared memory 203 and therefore, contention consequent to access conflict of the shared memory 203 arises. When contention arises, the time consumed for memory access by the CPU 201-1 becomes several hundred cycles and the processing of the real-time software 207 is delayed. Consequently, the CPU 201-1 may not be able to complete the processing by the time required by the real-time software 207, resulting in a state where real-time processing cannot be guaranteed.

Guarantee of real-time processing will be described. Real-time processing requires the return of a reply within a determined period, which is assumed as Δ [seconds]. In this example, the clock cycle of the CPU 201-1, which performed real-time processing is assumed to be clk [1/second]. Therefore, the clock count of the CPU 201-1 allowed during the elapse of period Δ is Δ·clk. If contention arises and the CPU 201-1 cannot issue 1 instruction by the count of Δ·clk, real-time processing cannot be guaranteed.

The clock count for 1, instruction is obtained by calculating C/I based on the issued instruction counter I and the clock counter C within a given period. Here, the threshold τ is represented as τ=Δ·clk. When C/I is less than or equal to the threshold τ, the CPU 201-1 is in a state that can guarantee real-time processing. When C/I is greater than the threshold τ, the CPU 201-1 is in a state that cannot guarantee real-time processing.

Since Δ and clk are values that can be determined at the time that specifications are drafted, the threshold τ can also be determined at the time that specifications are drafted. For example, when Δ=2, [microseconds] and clk=500, [MHz], τ=1000. Normally, the CPU 201-1 consumes several dozen clocks to access the shared memory 203. However, when contention occurs consequent to access conflict of the shared memory 203, several dozen to several hundred clocks are consumed and the operation efficiency of the CPU 201-1 may be reduced to as much as 30% during the peak.

Figure 5:
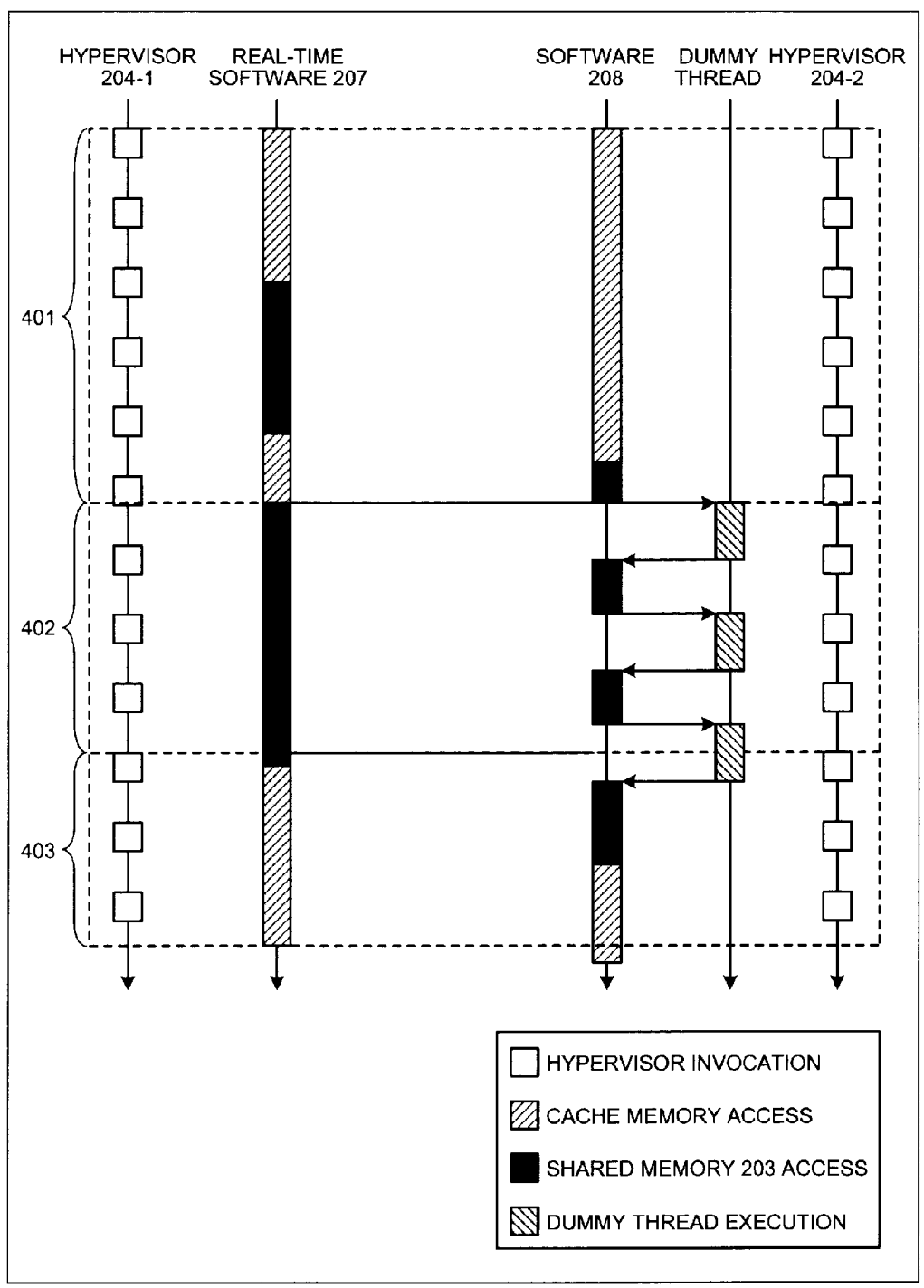
FIG. 5 is a diagram depicting a state where contention has been resolved.

FIG. 5 is a diagram depicting a state where contention has been resolved. In FIG. 5, similar to FIG. 4, the CPU 201-1 is executing the hypervisor 204-1 and the real-time software 207; and the CPU 201-2 is executing the hypervisor 204-2 and the software 208. In FIG. 4, during the period 402, the CPU 201-1 and the CPU 201-2 simultaneously access the shared memory 203 and contention consequent to access conflict has occurred.

However, during the period 402 in FIG. 5, the CPU 201-2 interchanges the software 208 and a dummy thread, whereby the contention consequent to access conflict is resolved. Consequently, the CPU 201-1 can complete the processing by the time demanded by the real-time software 207 and real-time processing can be guaranteed.

Figure 6:
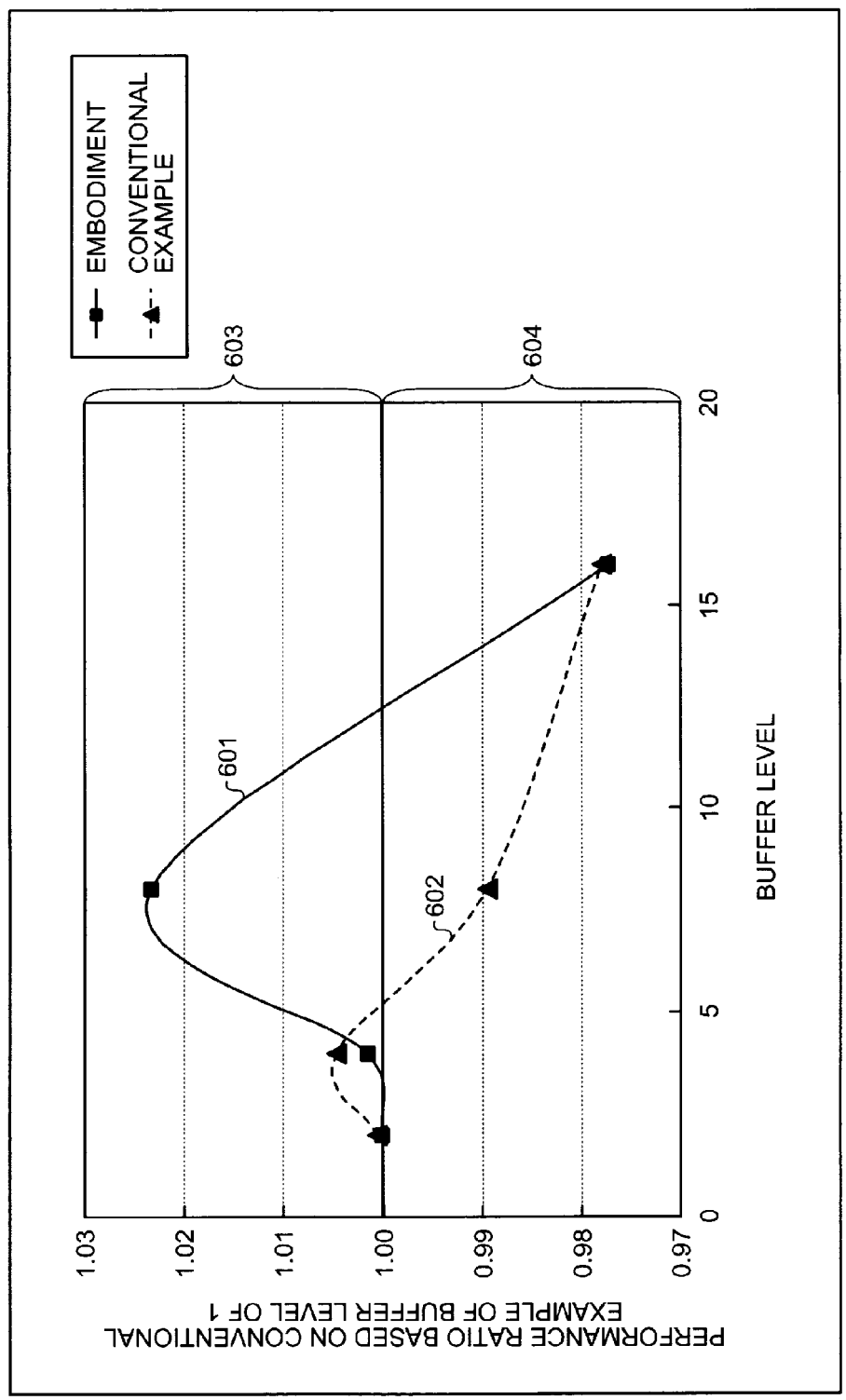
FIG. 6 is a graph depicting the performance ratio of the multi-core processor system 100 according to the present embodiment.

FIG. 6 is a graph depicting the performance ratio of the multi-core processor system 100 according to the present embodiment. The horizontal axis in FIG. 6 represents the buffer level count set in the bus 108 and the y-axis represents the performance ratio based on a reference of a conventional example of a buffer level count of 1. When performance is equivalent to a conventional example of a buffer level of 1, a point is plotted at 1.00 on the y-axis. For the multi-core processor system 100 according to the embodiment, the ratio of performance to a conventional example is plotted for each level and represented by curve 601. Further, Δ=1, [milliseconds] and clk=600, [MHz]. Similarly, for a conventional example of a multi-core processor system, the ratio of performance to the conventional example is plotted for each level and represented by curve 602.

Further, curve 601 and curve 602 are in an area 603 when the performance ratio is better than a reference that is a conventional example of a buffer level of 1, and when the performance ratio is worse that the reference, the curves 601, 602 are in an area 604. When the curves 601, 602 are in the area 603, the multi-core processor system 100 can guarantee real-time processing and when the curves 601, 602 are in the area 604, the multi-core processor system 100 cannot guarantee real-time processing. In the multi-core processor system, when the number of buffer levels of the bus the increases, although the utilization efficiency of the bus can be increased, the guarantee of real-time processing becomes difficult.

The curve 602 representing a conventional example is in an area 604, when the buffer level is 5, or more. Therefore, a conventional example of a multi-core processor system cannot guarantee real-time processing when the buffer level is 5, or greater. The curve 601 representing the present embodiment is in the area 603 up to a buffer level of 13. Therefore, the multi-core processor system 100 according to the embodiment can guarantee real-time processing up to a buffer level of 13.

FIG. 7 is a diagram depicting an example of the contents of the priority level table 303-1. The priority level table 303-1 has a process name field and an execution priority level field. The priority level table 303-2 has the same data. The process name field describes concrete process contents. In actuality, a program describing the process contents resides on the ROM 102, the RAM 103, or the flash memory 104 and the CPU 201-1 loads the program and executes the program as a thread. The execution priority level field indicates the execution priority level of the process indicated by the corresponding process name.

For example, when a "communication packet reception" process does not perform a packet process within a given period, a timeout state is entered and consequently, a guarantee of real-time processing is necessary. Therefore, the execution priority level field is set as "real-time". An "image rendering" process is a normal process and a guarantee of real-time processing is not necessary. Therefore, the execution priority level field is set as "normal". Similarly, for a "UI input" process, when a response period for the user has been determined by the specifications, a guarantee of real-time processing is necessary. For a "dictionary lookahead search" process, a guarantee of real-time processing is not necessary.

As a state where contention occurs, for example, a state where the multi-core processor system 100 is performing a Web browsing process is assumed. In the described state, the CPU 201-1 is executing a communication packet reception process and the CPU 201-2 is executing an image rendering process. The image rendering process frequently accesses the memory and has a high potential of causing access conflict of the shared memory 203 with the communication packet reception process.

In a state where the present embodiment has been applied, when contention consequent to access conflict occurs as in the state described above, the CPU 201-2, via the OS 205-2, increases the nice value of the image rendering process. The OS 205-2 allocates to the CPU 201-2, the image rendering process for which the nice value has been increased so that the image rendering process is further reduced. Consequently, the multi-core processor system 100 can prevent contention consequent to access conflict and can guarantee the real-time processing of the image rendering process.

As another state where contention occurs, for example, a state where the multi-core processor system 100 receives a character string input from the user is assumed. In the state described above, the CPU 201-1 is executing a UI input process and the CPU 201-2 is executing a dictionary lookahead search process. The dictionary lookahead search process frequently accesses the I/O and has a high potential of causing access conflict of the shared memory 203 with the UI input process.

In a state where the present embodiment has been applied, when contention consequent to access conflict occurs as in the state described above, the CPU 201-2, via the OS 205-2, increases the nice value of the dictionary lookahead search process. The OS 205-2 allocates to the CPU 201-2, the dictionary lookahead search process for which the nice value has been increased so that the dictionary lookahead search process is further reduced. Consequently, the multi-core processor system 100 can prevent contention consequent to access conflict and can guarantee the real-time processing of the UI input process.

FIG. 8 is a flowchart depicting message transmission processing by a hypervisor. The message transmission processing is performed each time the hypervisor is invoked. The CPU 201-1 confirms whether real-time software is under execution (step S801). If real-time software is under execution (step S801: YES), the CPU 201-1 acquires the issued instruction counter I (step S802). The CPU 201-1 acquires the clock counter C (step S803) and calculates the value of C/I, which is a determination value for determining whether contention is occurring (step S804). The CPU 201-1 compares the value of C/I and the threshold τ (step S805).

If the value of C/I is greater than the threshold τ (step S805: YES), contention is occurring and the CPU 201-1 generates a message to increase the nice value (step S806). A CPU that has received this message increases the nice value of the software currently under execution and since the priority level of the software consequently decreases, the execution of the software currently under execution is reduced.

The CPU 201-1 broadcasts the message among the hypervisors (step S807). The CPU 201-1 executes normal hypervisor processing (step S810), and ends the processing according to the flowchart. If the value of C/I is less than or equal to the threshold τ (step S805: NO), contention is not occurring and the CPU 201-1 performs the process at step S810, and ends the processing according to the flowchart.

If real-time software is not under execution (step S801: NO), the CPU 201-1 confirms whether the nice value of the software under execution is the initial value (step S808). If the nice value is not the initial value (step S808: NO), the CPU 201-1 sets the nice value of the software under execution to the initial value (step S809), and transitions to the process at step S810. If the nice value is the initial value (step S808: YES), the CPU 201-1 transitions to the process at step S810.

A nice value that is not the initial value indicates that the process executed by the CPU 201-1 is the cause of contention and to prevent contention, the CPU 201-1 can at the process at step S809, return to the original value, the process that was reduced. If contention is to be resolved, contention is often resolved by suspension for a period that is the smallest unit of time during which the scheduler of the OS has the potential of switching to the process that is the cause of contention. If resolution by the smallest unit of time often fails, configuration may be such that after step S808: NO, the CPU 201-1 calculates the value of C/I, compares the value of C/I with the threshold τ and confirms that contention has been resolved before executing the process at step S809.

FIG. 9 is a flowchart depicting message reception processing by a hypervisor. The CPU 201-2 receives a message transmitted among the hypervisors (step S901). In the present embodiment, the CPU 201-2 receives the message transmitted by the CPU 201-1. The CPU 201-2 checks whether the received message was broadcast by the CPU 201-2 (step S902).

If the CPU 201-2 broadcasted the message (step S902: YES), real-time processing is under execution and contention is occurring. Since the CPU 201-2 does not control the thread, the CPU 201-2 ends the processing according to the flowchart. If the CPU 201-2 did not broadcast the message (step S902: NO), the CPU 201-2 is the cause of the contention and therefore, the CPU 201-2 は executes a process that does not access the shared memory 203.

For example, the CPU 201-2 instructs the OS 205-2 to increase the nice value of the software currently under execution (step S903). If the OS does not have a nice value function, the CPU 201-2 may instruct the OS 205-2 to invoke a dummy thread.

Further, configuration may be such that at step S902: NO, if real-time software is not under execution, the CPU 201-2 calculates the value of C/I, compares the value of C/I and the threshold τ, and if contention is occurring, performs control of the thread. In this case, although the processing additionally includes the comparison of the value of C/I, the additional processing can be limited to the CPU involved in contention.

Further, in the present embodiment, although the CPU 201-1, in the message transmission processing, checks contention based on 2, priority levels, including the execution of real-time processing and no execution of real-time processing, 3, or more priority levels may be used to check contention.

As an example where such processing is performed, the CPU 201-1 sets 3, or more levels for the values taken by the execution priority level field in the priority level table 303-1. For example, the execution priority level of the "UI input" process is "high priority", which is between "real-time" and "normal"; the execution priority level of the "dictionary lookahead search" process is "low priority", which is below "normal". In the message transmission processing, in the process at step S801, "is real-time software under execution?" is replaced with "is software having a priority level other than low priority under execution?". In the process at step S806, the priority level of the software under execution is appended to the contents of the message.

In the message reception processing, after the process at step S902: NO and before the process at step S903, as a new condition, "is the priority level in the received message higher than the priority level of the software currently under execution?" is added. If the condition is true, the executing CPU performs the process at step S903 and if the condition is not true, the CPU ends the processing without performing the process at step S903.

In the processing state described above, for example, the CPU executing the UI input process having a high priority and depicted in FIG. 7, at step S801, follows the Yes path and at the process at step S807, broadcasts a message to other cores. When the CPU executing the image rendering process having a priority level of normal receives the message, the condition "is the priority level in the received message higher than the priority level of the software currently under execution?" is true, the CPU performs the process at step S903 and performs control of the nice value.

If the CPU executing the communication packet process requiring real-time processing receives the message, the condition "is the priority level in the received message higher than the priority level of the software currently under execution?" is not true and the CPU does not perform control of the nice value. Thus, the CPU that performs the message transmission processing sets 3, or more priority levels and checks contention; and the CPU that performs the message reception processing further judges the priority level, whereby the processing of a CPU performing a low priority process is reduced. As a result, the multi-core processor system 100 can preferentially perform processes of high priority.

When the execution priority levels are 3, are greater, when step S903 is executed, the value by which the nice value is increased may be set based on the priority level in the received message and the priority level of software currently under execution. For example, configuration may be such that processing is performed where if the priority level in the received message is real-time and the priority level of the software currently under execution is normal, since the priority levels are separated by 2, levels, the nice value is increased by 2. Thus, the nice value is controlled stepwise by the hypervisor 204-2, whereby the OS 205-2 executes further reduction, the lower the priority level is; and real-time processing allocated to the CPU 201-1 can be processed first.

Even when the execution priority levels are 2, the process of increasing the value by which the nice value is increased by 2, levels or more may be added. For example, the CPU 201-2 under goes the message reception processing, and after increasing the nice value by 1, and before returning the nice value to the initial value, receives the message. In this case, since contention is still occurring, irrespective of the nice value having been increased, the CPU 201-2 further increases the nice value by 1, whereby the contention can be more easily resolved.

As described, the multi-core processor system, the thread control method, and the thread control program enable a CPU that is executing real-time processing and involved in contention to be identified. All of the CPUs, excluding the CPU performing real-time processing and the identified CPU, are controlled to execute threads that do not access shared memory. As a result, the multi-core processor system can guarantee real-time processing.

Further, configuration may be such that the multi-core processor system controls all of the CPUs, excluding the identified CPU, to execute threads that do not access the shared memory. As a result, when from the identified CPU, a control request is made to all CPUs, excluding the identified CPU, without searching for a competing CPU, all CPUs (excluding the identified CPU) are requested to perform control, whereby processing can be simplified since search processing is not performed.

Configuration may be such that the multi-core processor system identifies from among multiple CPUs, CPUs involved in contention and the identified CPUs are controlled to execute threads that do not access shared memory. As a result, the multi-core processor system causes only the CPU that caused the contention to perform thread control and allows CPUs that do not cause contention to continue normal processing.

Configuration may be such that the multi-core processor system, during an interval when contention occurs, splits the interval into periods and allocates to a CPU that controls a thread, an execution period for the thread allocated to the CPU and a period for a thread that does not access memory. As a result, the multi-core processor system resolves contention and the thread allocated to the CPU can be performed.

Configuration may be such that the multi-core processor system, for each CPU and based on an issued instruction count of the instructions issued by a CPU and a cycle count for the CPU, calculates the issued-instruction efficiency; and based on the calculated issued-instruction efficiency and a given threshold τ, detects contention. As a result, the multi-core processor system can detect contention consequent to access conflict and can guarantee real-time processing.

Configuration may be such that the multi-core processor system detects a core to which a thread having the highest execution priority level is allocated by a CPU. As a result, the multi-core processor system, by determining the threads requiring guarantee of the real-time processing, irrespective of the CPU to which the thread is allocated, contention can be resolved and the real-time processing can be guaranteed.

The control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The multi-core processor system, the thread control method, and the thread control program effect execution of real-time processing and enable the real-time processing of a core involved in contention to be guaranteed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising a plurality of cores and memory accessible from the cores, wherein a given core is configured to:
    detect among the cores, first cores having a highest execution priority level,
    calculate an issued-instruction efficiency of each of the first cores by dividing a cycle count for the first core by an issued instruction count for the first core,
    identify among the detected first cores, a second core accessing the memory and having the issued-instruction efficiency greater than a given threshold, and
    control a third core accessing the memory and thereby causing an access conflict with the second core, to execute for a given interval during an interval when the access conflict occurs, a thread that does not access the memory.

2. The multi-core processor system according to claim 1, wherein
    the given core is configured to control the third core that is among the first core.

3. The multi-core processor system according to claim 1, wherein
    the given interval is an interval split from the interval when the access conflict occurs, and split according to a thread allocated to the third core and a thread that does not access the memory.

4. The multi-core processor system according to claim 1, wherein
    the given core is configured to detect from among the cores, the first cores allocated a thread having the highest execution priority level.

5. A thread control method of a multi-core processor system comprising a plurality of cores and memory accessible from the cores, the thread control method being executed by the cores and comprising:
- detecting among the cores, first cores having a highest execution priority level;
- calculating an issued-instruction efficiency of each of the first cores by dividing a cycle count for the first core by an issued instruction count for the first core;
- identifying among the detected first cores, a second core accessing the memory and having the issued-instruction efficiency greater than a given threshold; and
- instructing control of a third core accessing the memory and thereby causing an access conflict with the second core, to execute for a given interval during an interval when the access conflict occurs, a thread that does not access the memory.

6. A non-transitory computer-readable recording medium storing a control program causing a plurality of cores in a multi-core processor system comprising the cores and memory accessible from the cores, to execute a process, the process comprising:
- detecting among the cores, first cores having a highest execution priority level;
- calculating an issued-instruction efficiency of each of the first cores by dividing a cycle count for the first core by an issued instruction count for the first core;
- identifying among the detected first cores, a second core accessing the memory and having the issued-instruction efficiency greater than a given threshold; and
- instructing control of a third core accessing the memory and thereby causing an access conflict with the second core, to execute for a given interval during an interval when the access conflict occurs, a thread that does not access the memory.

* * * * *